United States Patent [19]

Vincent

[11] Patent Number: 4,659,975
[45] Date of Patent: Apr. 21, 1987

[54] REMOTE SPEED CONTROLLER FOR A MOTOR

[75] Inventor: David Vincent, Burgess Hill, United Kingdom

[73] Assignee: Vent-Axia Limited, Crawley, England

[21] Appl. No.: 783,405

[22] Filed: Oct. 3, 1985

[30] Foreign Application Priority Data

Oct. 4, 1984 [GB] United Kingdom ............... 8425119

[51] Int. Cl.⁴ .............................................. H02P 7/40
[52] U.S. Cl. .................................... 318/814; 361/329
[58] Field of Search .............. 318/729, 749, 750, 751, 318/752, 814, 816, 817; 361/328–330, 31, 96, 97

[56] References Cited

U.S. PATENT DOCUMENTS

| | | | |
|---|---|---|---|
| 2,847,629 | 8/1958 | Schaefer | 318/751 |
| 3,988,709 | 10/1976 | McKinnon et al. | 361/24 X |
| 3,996,499 | 12/1976 | Gary et al. | 361/29 X |
| 4,215,303 | 7/1980 | Brimer | 318/752 |
| 4,446,416 | 5/1984 | Wanlass | 318/817 X |
| 4,555,654 | 11/1985 | Spradling et al. | 318/817 X |

FOREIGN PATENT DOCUMENTS

| | | |
|---|---|---|
| 58-29393 | 2/1983 | Japan . |
| 58-79496 | 5/1983 | Japan . |
| 2105931 | 3/1983 | United Kingdom . |

Primary Examiner—Patrick R. Salce
Assistant Examiner—Marc S. Hoff
Attorney, Agent, or Firm—Toren, McGeady and Goldberg

[57] ABSTRACT

A remote speed controller for an electric motor, the controller comprising a switching unit having three switches. A capacitor pack incorporating two capacitors is connected to the switching unit such that different combinations of the capacitors can be selected by one switch. The controller is connected in circuit between an AC voltage supply and windings of a motor so that selective actuation of the one switch changes the speed of the motor in accordance with the values of the capacitors selected. Further switches are incorporated to provide reverse motor capability and remote sensor capability.

7 Claims, 3 Drawing Figures

REMOTE SPEED CONTROLLER FOR A MOTOR

BACKGROUND OF THE INVENTION

This invention relates to a remote speed controller for an electric motor employing capacitors and particularly, but not exclusively, relates to such a controller for controlling the speed of a fan motor.

The present invention is closely associated with the motor speed control circuit forming the subject of applicants co-pending patent application Ser. No. 783,431 filed on the same day as the present Application.

In said co-pending patent application, there is described a permanent capacitor reversible motor speed control circuit wherein a plurality of capacitors are connected across the windings of the motor via means which, when selectively switched or physically actuated, cause different combinations of said capacitors to be connected in series or in parallel across the windings such as to select a particular motor speed and to change the performance characteristics of the motor in accordance with the particular combination of capacitors selected. Preferably, the capacitors are located in and form a capacitor pack which is connected by means of a plug or switched plug to a socket assembly which may be located within or on the motor casing or within or on an appliance casing in which the motor is installed.

SUMMARY OF THE PRESENT INVENTION

An object of the present invention is to provide such a speed controlling circuit operable by remote control.

Thus, according to the present invention, there is provided a remote speed controller for a motor having a removable capacitor pack, the controller comprising a switching unit connected to means for receiving a capacitor pack, and a capacitor pack consisting of a plurality of capacitors, the switching unit, in use, being connected in circuit with an AC voltage source and windings of said motor whereby selective actuation of the switching unit connects different combinations of said capacitors to the windings to vary thereby the speed of the motor in accordance with the capacitors connected.

Further switches and features can be included in the switching unit such as indicator lamps, reverse motor rotation, remote sensors etc.

In an embodiment of the present invention, the capacitor pack comprises the capacitor pack of the motor, that is to say the motor capacitor pack is unplugged from the socket assembly on the motor or appliance and transferred to the controller which is connected by leads to the motor windings, the switching unit can then be used to select a particular motor speed by selection of one or a plurality of capacitors to connect a particular capacitor value across the windings of the motor.

Thus, the variety of selective speeds can be obtained from components already embodied within the main appliance having the motor, thus saving costs.

A feature of the controller of the present invention is the inherent ability of the controller to automatically 'adopt' the voltage/frequency of the motor or appliance. Thus the controller is truly 'universal' in concept since the speed controller does not have to be manufactured in a variety of different voltage and frequency ranges, thereby achieving rationalised and low cost production.

A further feature of the present invention is the provision of a switch for connection to a remote sensor which allows the appliance to be switched on or controlled automatically at whatever speed or functional mode the controller has been set to, such sensor or automatic switching device being by way of example a timer, thermostat, humidistat or secondary ON/OFF switch, smoke sensor or any other form of remote switching device.

A further switch can also be provided to reverse the motor rotation or leave the motor static whilst activating a further device.

BRIEF DESCRIPTION OF THE DRAWINGS

The invention will now be described by way of example only with particular reference to the accompanying informal drawings wherein.

DETAILED DESCRIPTION OF THE PREFERRED EMBODIMENT

Figure 1:
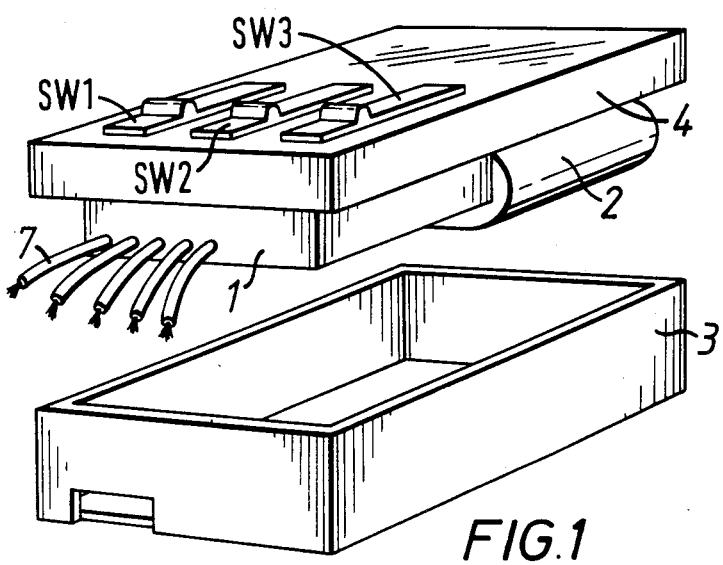
FIG. 1 is a perspective view of the switching unit and associated capacitor pack of the speed controller.
Figure 2:
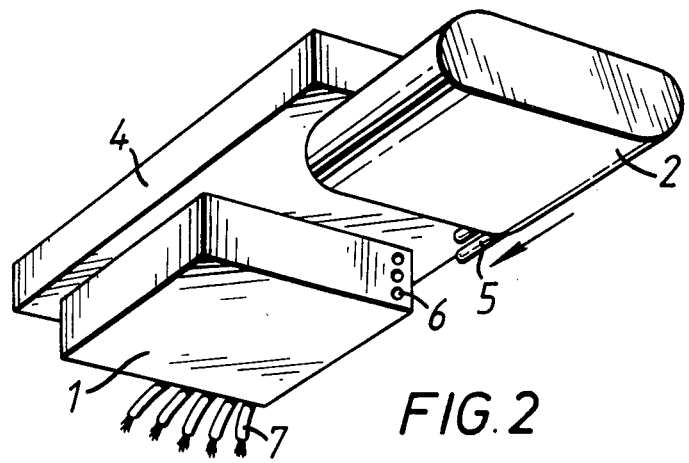
FIG. 2 is a view of the switching unit and the capacitor pack of the controller showing the plug and socket connection.

As shown in FIG. 1, the speed controller comprises a switching unit 1 and capacitor pack 2 located within a casing 3, the switching unit and capacitor pack being mounted on the lid 4 of the casing 3 and the capacitor pack 2 having three pins 5 engageable in the corresponding holes 6 of the socket of the switching unit 1. Leads 7 connect the controller to the appliance.

The lid 4 of the casing is provided with three switches SW1; SW2; SW3 (See FIG. 3).

Figure 3:
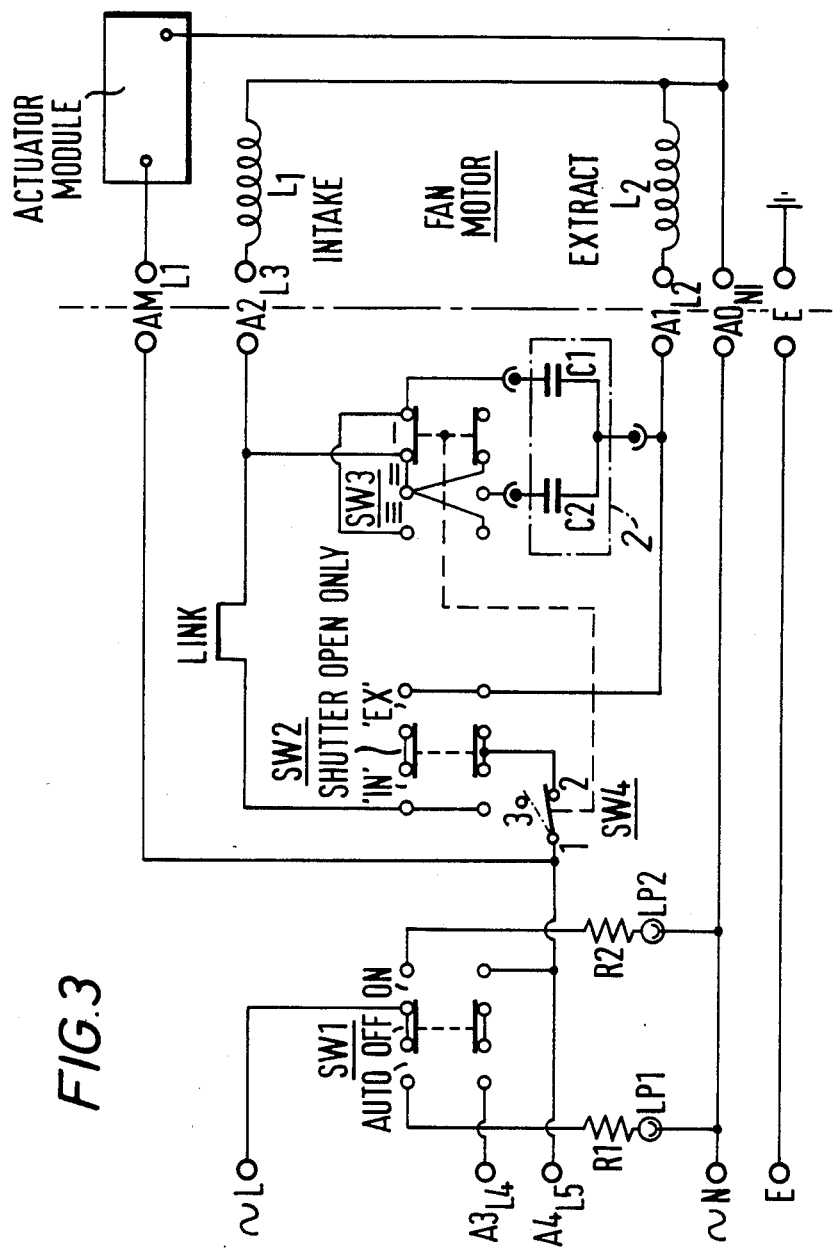
FIG. 3 is a circuit diagram of the speed controller and the associated capacitor pack.

As shown in FIG. 3, the switching unit 1 includes the primary three switches SW1, SW2, SW3, having the contacts connected across an AC voltage source and between the source and the windings L1, L2 of the fan motor. The capacitor pack 2 comprises capacitors C1, C2 connected in a manner to permit connection in parallel by suitable actuation of switch SW3. By selective actuation of the switch SW3, the capacitors are connected in any required combination across the windings of the fan motor to alter thereby the motor speed. In particular, as shown in FIG. 3, switch SW3 selectively connects the capacitors C1 and C2 between the terminals A1 and A2 which are, in turn, connected to the motor windings L2 and L1, through the motor terminal L2 and L3, respectively. In a first position of the switch SW3, symbolized by a single line meaning "low speed", only capacitor C1 is connected between terminals A1 and A2; in a second position, symbolized by a double line meaning "intermediate speed", only capacitor C2 is connected; and in a third position, symbolized by a triple line meaning "high speed", both capacitors C1 and C2 are connected in parallel between terminals A1 and A2. It will be apparent combinations of capacitors other than those illustrated may be employed.

A remote switch or sensor may be connected across the terminals A3, A4, the former of which is connected to one of the fixed contacts of switch SW1 and terminal A4 is connected to another fixed contact of switch SW1 and to a fixed terminal of switch SW2 via a further switch SW4 which is ganged to switch SW3.

The switch SW2 acts to reverse the motor direction or to leave the motor switched off but the shutter actuated. It should be noted that switch SW4 is ganged to switch SW3 in a manner to temporarily disconnect the mains supply during selection of motor speed by switch SW3, thus reducing switch contact arcing.

The sensor or remote switch SW1 allows the controller to be switched on or controlled automatically at whatever speed or functional mode the controller is set to.

It will be appreciated that the invention is susceptible to considerable modification and is not deemed limited to the particular features described and shown in the drawings. For instance, the capacitor pack may be mounted elsewhere on the controller and not necessarily on the lid of the casing as described.

What we claim is:

1. A remote speed controller for a motor having a removable capacitor pack, the controller comprising:
    a switching unit connected to means for receiving a capacitor pack;
    and a capacitor pack having a plurality of capacitor means;
    the switching unit comprising a single switch connected in circuit with an AC voltage source and windings of said motor, whereby operation of said single switch can selectively connect individual capacitor means of said pack or groups of said capacitor means to the windings to vary thereby the speed of the motor in accordance with the capacitors connected.

2. A controller as claimed in claim 1, wherein said single switch can selectively connect individual capacitor means of said pack or all of said capacitor means to the windings.

3. A controller as claimed in claim 2, wherein the switching unit includes further switching means actuatable to alter connection to the windings to said AC voltage source so that the motor rotation can be reversed.

4. A controller as claimed in claim 3, wherein said further switching means has an additional position wherein the windings of said motor are not connected to the AC voltage source.

5. A remote speed controller for a motor having a removable capacitor pack, the controller comprising a switching unit connected to means for receiving a capacitor pack, and a capacitor pack consisting of a plurality of capacitors, the switching unit in use being connected in circuit with an AC voltage source and windings of said motor, whereby selective actuation of the switching unit connects different combinations of said capacitors to the windings thereby varying the speed of the motor in accordance with the capacitors connected, wherein said controller further comprises a further switch in circuit between the switching unit and the AC voltage source and actuatable to a position connecting the switch unit to said AC voltage source or to a position connecting said AC voltage source to a remote sensor connected in circuit with said switching unit.

6. A controller as claimed in claim 5 wherein said capacitor pack comprises the removeable capacitor pack of said motor.

7. A remote speed controller for a motor having a removable capacitor pack, the controller comprising a switching unit connected to means for receiving a capacitor pack, and a capacitor pack consisting of a plurality of capacitors, the switching unit in use being connected in circuit with an AC voltage source and windings of said motor, whereby selective actuation of the switching unit connects different combinations of said capacitors to the windings thereby varying the speed of the motor in accordance with the capacitors connected, wherein said controller further comprises a further switch ganged with the switching unit to disconnect said AC voltage source from said capacitor pack during said selective actuation.

* * * * *